(12) United States Patent  
Cooper

(10) Patent No.: US 7,725,373 B2
(45) Date of Patent: May 25, 2010

(54) TIMING MECHANISM AND DIRECT MESSAGING FOR ELECTRONIC TRADING PLATFORM

(75) Inventor: Steven Cooper, Rumson, NJ (US)

(73) Assignee: ICAP Services North America LLC, Jersey City, NJ (US)

( * ) Notice: Subject to any disclaimer, the term of this patent is extended or adjusted under 35 U.S.C. 154(b) by 142 days.

(21) Appl. No.: 10/933,152

(22) Filed: Sep. 2, 2004

(65) Prior Publication Data

US 2005/0097029 A1 May 5, 2005

Related U.S. Application Data

(60) Provisional application No. 60/499,673, filed on Sep. 2, 2003.

(51) Int. Cl.
*G06Q 40/00* (2006.01)

(52) U.S. Cl. .................. 705/35; 705/36 R; 705/37; 345/440

(58) Field of Classification Search ............. 705/35–45; 345/440
See application file for complete search history.

(56) References Cited

U.S. PATENT DOCUMENTS

| | | | | |
|---|---|---|---|---|
| 4,393,446 A * | 7/1983 | Gurr et al. ................... | 713/502 |
| 4,745,559 A | 5/1988 | Willis et al. | |
| 4,884,217 A * | 11/1989 | Skeirik et al. ................. | 706/56 |
| 5,412,291 A * | 5/1995 | Payne et al. .................. | 318/102 |
| 6,014,627 A | 1/2000 | Togher et al. | |
| 6,233,566 B1 | 5/2001 | Levine et al. | |
| 6,278,982 B1 | 8/2001 | Korhammer et al. | |
| 6,839,686 B1 * | 1/2005 | Galant ....................... | 705/36 R |
| 7,113,190 B2 * | 9/2006 | Heaton ....................... | 345/440 |
| 2001/0028366 A1 * | 10/2001 | Ohki et al. ................... | 345/772 |
| 2002/0073017 A1 * | 6/2002 | Robertson .................... | 705/37 |
| 2002/0174043 A1 * | 11/2002 | Gilbert et al. ................ | 705/35 |
| 2003/0004853 A1 * | 1/2003 | Ram et al. .................... | 705/37 |
| 2003/0023525 A1 * | 1/2003 | Chen ........................... | 705/35 |
| 2003/0041000 A1 * | 2/2003 | Zajac et al. ................... | 705/37 |
| 2003/0093360 A1 * | 5/2003 | May ............................. | 705/37 |
| 2003/0187777 A1 * | 10/2003 | Kochansky et al. ........... | 705/37 |
| 2004/0100467 A1 * | 5/2004 | Heaton ........................ | 345/440 |
| 2007/0076002 A1 * | 4/2007 | Heaton ........................ | 345/440 |
| 2007/0083452 A1 * | 4/2007 | Mayle et al. ................ | 705/36 R |
| 2007/0162365 A1 * | 7/2007 | Weinreb ....................... | 705/35 |
| 2007/0294158 A1 * | 12/2007 | Patel et al. .................. | 705/36 R |

* cited by examiner

*Primary Examiner*—Narayanswamy Subramanian
(74) *Attorney, Agent, or Firm*—Dickstein Shapiro LLP

(57) ABSTRACT

A system and interface for trading financial instruments includes an intermediary computer system that is operable to communicate with one or more trader terminals. The intermediary computer system includes one or more processors and storage media, and it communicates with trader terminals and displays to the trader terminals a listing of financial instruments, and information related to such financial instruments, that are available for trading. The intermediary computer system periodically updates the option adjusted price of financial instruments to provide traders with a time period in which the price will remain stable and during which time the traders can confidently execute orders based on the then available price. A timer, which is constantly visible to traders, displays the amount of time remaining until the displayed adjusted prices will be updated.

14 Claims, 5 Drawing Sheets

| ▥ BrokerTec (TEST) - DKESSLER2 [BUBEARS CKDK2] - DKESSLER2[dkessler2] | | | | | | | | | _ ☐ X |
|---|---|---|---|---|---|---|---|---|---|
| File Edit View Market Orders Bulk Order Window Help | | | | | | | | | |

| ▥ Stack Window [AGCY_AOAS|Public] | | | | | | | | | _ ☐ X |
|---|---|---|---|---|---|---|---|---|---|
| ID |AGCY_AOAS ▼| Filter | | | | | | | |
| Benchmarks |AGCY_AOAS| | | | | | | | 15s s f ▣ |

| +/- | Security | OAP Bid | BSize | Bid | Offer | OSize | OAP Offer | Last | LSize | Volume |
|---|---|---|---|---|---|---|---|---|---|---|
| ⊞ | XMC 2.875 0905_2Y | 10D.09B1 | 35 | 0.50 | | | | .050 | 10 | 120 |
| ⊞ | XFN 2.375 03/06_2Y | | | | | | | | | |
| ⊞ | XFN 2.375 04/06_2Y | | | | | | | | | |
| ⊞ | XFN 1.750 06/06_2Y | | | | | | | | | |
| ⊞ | XFN 2.750 08/06_2Y | | | | TAK | 2.50 | 25 | 99.1207 | 2.50 | 10 | 5 |
| ⊞ | XMC 3.125 03/06_2Y | | | | 3.00 | 5 | 99.8365 | 3.50 | 5 | 30 |
| ⊞ | XFN 4.000 11/06_2Y | | | | | | | | | |
| ⊞ | XFN 4.750 12/06_2Y | | | | | | | | | |

BOT 10 of 10           Total 10@250
XFN 2.750 08/06_2Y

| Yield | Size | Hidden | Type | ☐ Leave Order Only Best | Custom Delete | Delete All My Orders |
|---|---|---|---|---|---|---|
| 2.50 | 10 | 0 | FaS | | | |

| BID | OFFER | Delete Bid | 5 | 10 | 25 | Delete Offer | HIT | TAKE |
|---|---|---|---|---|---|---|---|---|
| | | | 50 | 100 | Clear | | | |

Bought 10 XFN 2.750 08/06_2Y @2.50

| ▥ Log Book [*] | _ ☐ X |
|---|---|

| Book | Clearing Trades | Blotter | Ticker | User Actions | History | Market Messages | System Messages | Directed Messages |
|---|---|---|---|---|---|---|---|---|

| Time | Message |
|---|---|
| 2:04:22 PM | XMC 3.125 08/06_2Y OA price 99.8073, Hedge 2_YEAR 100.00<br>vol 39.02 skew 43.03 AOAS 3.50 dv01 -251.00, Curve 3m 1.053/0.000<br>6m 1.157/-0.085 12m 1.379/IB74 2Y 2.244/3.032 3Y 2.937/2.290 4Y 3.297/23.033<br>5Y 3.763/18.404 7Y 4.502/12.381 10Y 5.126/1.269 30Y 5.988/4.544 |
| 4:24:22 PM | XMC 2.875 09/05_2Y OA price 100.0992, Hedge 2_ YEAR 100.00<br>vol 59.00 skew 53.69 AOAS 0.50 dv01 -34.00, Curve 3m 1.093/0.000<br>6m 1.157/-0.085 12m 1.379/1.B77 2Y 2.244/3.009 3Y 2.928/2.279 4Y 3.290/23.623<br>5Y 3.769/18.623 7Y 4.504/12.254 10Y 5.130/1.284 30Y 5.985/4.488 |
| 4:29:09 PM | XFN 2.750 08/06_2Y OA price 99.1207, Hedge 2_YEAR 100.00<br>vol 39.26 skew 45.39 AOAS 2.50 dv01 -257.00, Curve 3m 1.080/0.000<br>6m 1.147/-0.087 12m 1.389/0.376 2Y 2.281/-3.814 3Y 2.739/18.501 4Y 3.461/6.266<br>5Y 3.944/1.395 7Y 4.557/5.223 10Y 5.051/4.673 30Y 5.973/13.162 |

TIMING MECHANISM AND DIRECT MESSAGING FOR ELECTRONIC TRADING PLATFORM

CROSS REFERENCE TO RELATED APPLICATION

This application claims priority to U.S. Provisional Patent Application Ser. No. 60/499,673 filed on Sep. 2, 2003.

BACKGROUND OF THE INVENTION

Financial markets function to bring together buyers and sellers and provide a mechanism for financial instruments to be traded. In recent years the use of electronic trading systems has revolutionized the industry as people have increasingly favored electronic trading systems over the older, manual methods of trading. Financial markets favor electronic trading systems as electronic trading systems offer reduced labor costs, increased accuracy, real time market information and greater versatility in communications.

Electronic trading systems are well known in the art. For example, U.S. Pat. No. 4,674,044, issued to Kalmus et al., entitled "Automated Securities Trading System" describes a system for trading securities wherein a centralized computer communicates with trader terminals to obtain the best bid and asked prices in order to implement a trade. Similarly, U.S. Pat. No. 5,136,501, issued to Silverman et al., entitled "Anonymous Matching System" provides an automated matching system where a centralized computer in communication with traders matches bid and ask prices for a trade, subject to the buyers and sellers matching specified criteria. The system described by Silverman et al. is also operable to automatically update the prices based on the best available bids present in the system.

BRIEF SUMMARY OF THE INVENTION

The present invention relates to a system for trading financial instruments. The system for trading financial instruments includes an intermediary computer system that communicates with trader terminals to provide a full listing of financial instruments available for trade, including specific information for each instrument. The intermediary computer system further provides periodic updates of the option adjusted price for the particular types of financial instruments available through the system, a timer to indicate the amount of time remaining before an update of the option adjusted price will occur, and the ability to send traders direct messages.

The intermediary computer system communicates with the trader terminals to display on the terminals a listing of financial instruments available to trade, the option adjusted price of the financial instruments and specific information about each particular financial instrument, e.g., the financial instrument's coupon or maturity date. The intermediary computer system periodically updates the option adjusted price based on the type of financial instrument offered. The option adjusted price is updated periodically rather than on a continuous basis so that there is a sufficient period of time in which the price of the instrument is stable and during which time the traders can confidently execute a trade against such instrument. A timer, which is constantly visible to traders using the electronic trading system, displays the amount of time remaining until displayed adjusted prices will be updated.

The intermediary computer system is also operable to communicate directly with selected traders or groups of traders in the form of directed messages to the trader terminals. The directed messages allow traders to receive real time information regarding trade confirmations or to receive the terms of a transaction. Directed messages can also be used to communicate warning information to the traders. For example, a warning message may be transmitted to a trader terminal if the intermediary computer system receives an order better than what had previously been communicated to the trader terminal.

BRIEF DESCRIPTION OF THE DRAWINGS

FIG. 3 shows the graphical user interface for display to a trader.

FIG. 4 shows the graphical user interface for display to a trader illustrating the timer feature at twelve seconds.

FIG. 5 shows the graphical user interface for display to a trader illustrating the timer feature at three seconds.

DETAILED DESCRIPTION OF THE INVENTION

Figure 1:
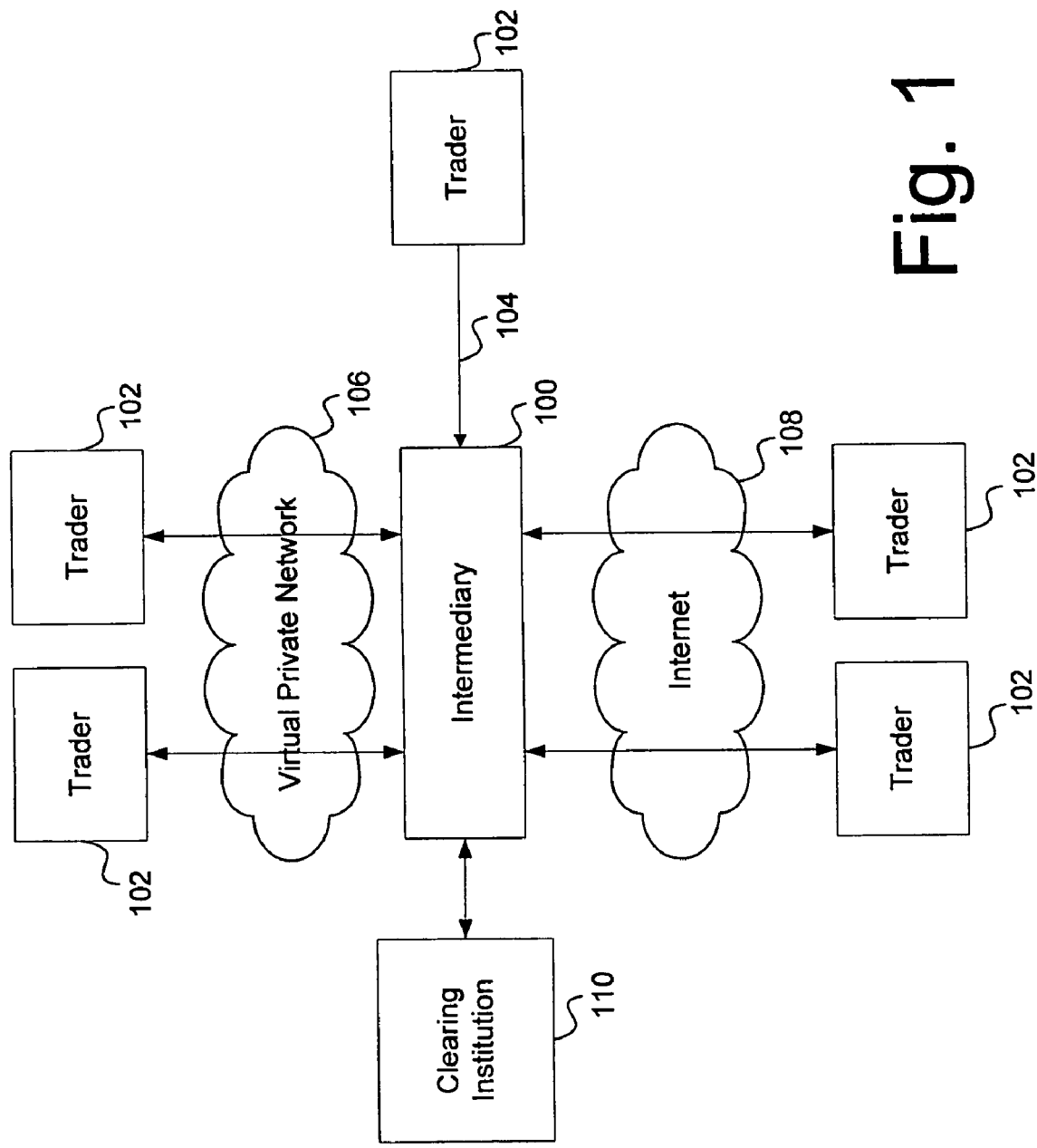
FIG. 1 is a block diagram illustrating a preferred embodiment of a system for trading financial instruments.

The present invention will now be described with reference to the Figures. A preferred embodiment of a system for trading financial instruments is shown in FIG. 1. As shown in FIG. 1, the system preferably comprises an intermediary computer system 100 and a plurality of trader terminals 102. Trader terminals 102 are adapted to communicate with intermediary computer system 100 via suitable communication means such as a private line 104, virtual private networks 106, and the Internet 108. Intermediary 100 preferably comprises one or more processors and storage media suitable for implementing the architecture and processing described below. Also shown in FIG. 1 is a clearing institution 110 adapted for transferring funds between system participants.

Figure 2:
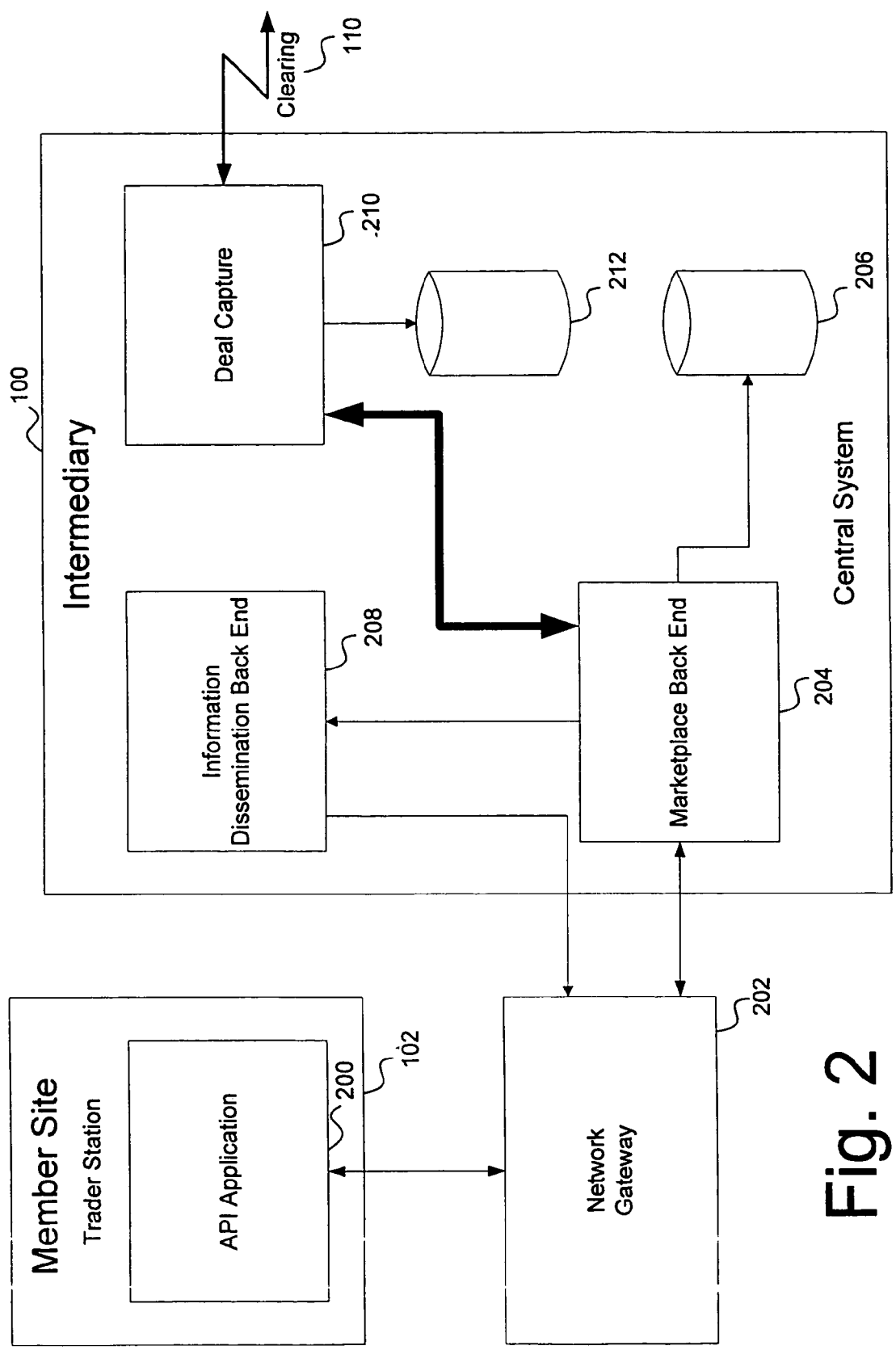
FIG. 2 is a bock diagram illustrating the components of the intermediary system and the trading terminals.

Aspects of the system shown in FIG. 1 are shown in more detail in FIG. 2. As shown in FIG. 2, each trader terminal 102 preferably comprises an API (application programming interface) 200 to provide an interface for communication with intermediary 100. In the embodiment of FIG. 2, traders access the intermediary through a suitable network gateway 202. A marketplace back end 204 receives orders entered via trader terminals 102 and stores them in electronic storage medium 206. An information dissemination back end 208 disseminates information concerning executed trades to network gateway 202. Deal capture 210 collects and stores in electronic storage medium 212 all transactions executed on the intermediary system.

A preferred embodiment of the operation of the present system will now be described in connection with FIGS. 3-6. FIG. 3 depicts a preferred embodiment of a graphical user interface for display to a trader. As shown in FIG. 3, the graphical user interface preferably comprises a stack window and a log book window.

The stack window preferably displays a table that includes information concerning a plurality of instruments available to trade. Each row in the table preferably displays information concerning a particular security. In the embodiment shown in FIG. 3, each displayed instrument is a callable agency security such as Fannie Mae or Freddie Mac GSE security with an embedded European-style call option. Other embedded option styles (e.g., American, Bermuden) may alternatively be employed.

The table further preferably comprises a plurality of columns for displaying information concerning each security. In particular, the "Security" column identifies the security and specifies its coupon, maturity date, and the benchmark swap leg for dynamic hedging purposes. The "Security" column may also include the call date of the security. The "OAP Bid" column displays the current option adjusted price of the bid displayed in the "Bid" column, as described below. The "BSize" column depicts the available volume at the best current bid price. The "Bid" column specifies this best current bid price.

The "Offer" column depicts the best current offer price/spread for the security. The "OSize" column depicts the size available at that price/spread. The "OAP Offer" column depicts the option adjusted price of the offer displayed in the "Offer" column, as described below. The "Last" column depicts the price of the last or current transaction for this particular security. The "LSize" column depicts the size of the last or current transaction, and the "Volume" column depicts the total volume traded for that instrument in that trading day.

One of the securities in FIG. 3, "XFN 2.750 8/06_2Y," is shown as currently trading. During an active trade, the bid or offer price is preferably made to flash and a "take" or "hit" indication is displayed on the screen.

The "X" in the title of the security is used to denote that this particular security is a callable security. The next two letters are used to describe the type of security (e.g., "FN" for "Fannie Mae" or "MC" for "Freddie Mac").

The number following the security type (e.g., "2.750") denotes the security's coupon. The date (e.g., "08/06") specifies the security's maturity date. The abbreviation following the underscore (e.g., "2Y") describes the swap leg, or hedge, for this security. In this example, "2Y" stands for a two year treasury bond.

Each row in the stack window also has a plus sign at the far left. The user may click this sign to expand the display and view the full order book for that security.

The stack window in FIG. 3 also preferably comprises an order entry panel below the list of securities. When a particular security is selected from the above list, the order entry panel allows the user to enter appropriate trading commands for the security such as bid/offer or hit/take. The order entry panel may also comprise numbered buttons to facilitate the entry of specified sizes.

The "OAP Bid" and "OAP Offer" columns preferably display option adjusted bid and offer prices for each security that account for the value of the security's price as it corresponds to the spread of that instrument and the updating yield curve, swaption volatility, and calculation feeds. These prices may be calculated in accordance with a predetermined algorithm such as the adjusted-price convention for callable securities proposed by the Bond Market Association (BMA). The BMA formula uses four inputs to determine an option adjusted bid or offer price: the details of a particular security, an option adjusted spread, a skew adjusted volatility, and the designated yield curve. A preferred embodiment for calculating OAP bids and OAP offers that differs somewhat from that proposed by the BMA, which may be used to calculate OAP bids and offers in the present system, is described below.

In a preferred embodiment, displayed OAP bid and OAP offer prices are not updated on trader screens on a continuous basis. Instead, at periodic intervals determined by the intermediary, the intermediary determines whether or not any input utilized to calculate an OAP price has changed, and if so, updates the displayed OAP price. In a preferred embodiment, the periodic interval may be 15 seconds for the securities shown in FIG. 3. Other appropriate periods may be selected for other securities. For example, a longer period may be appropriate for different types of embedded options (puts/calls) or other products such as callable bonds, municipal bonds, derivatives or mortgage backed securities. Securities such as CMOs (collateral mortgage obligations), for example, have complex properties including optionality, monthly payments, structures, less liquidity, etc, where a trader may need more time to evaluate the intermediary's option adjusted prices against their own internal option models. Therefore, more time may be need so traders can make rational decisions to execute a transaction or not. However, in some instances, traders may need less time to make rational decisions of whether to execute a transaction. The timer intervals are therefore flexible and able to reflect the needs of traders and the many products that use embedded options or outright options.

Periodic, rather than continuous, updating of OAP prices facilitates trading by providing a time period of sufficient duration during which prices will not fluctuate and traders may execute against them. Continuously fluctuating OAP prices may cause traders to freeze, become confused and therefore resist trading, or not trade at all, in essence making it difficult for traders to complete a trade at any specified price.

Periodic price updating, however, may create confusion for traders concerning when a price will be updated and may discourage traders from trading on the basis of a displayed price if they fear that it may be updated shortly. To address this problem, a preferred embodiment of the present system further comprises a timer which is constantly visible to traders using the electronic trading system and displays the amount of time remaining until displayed adjusted prices will be updated.

The timer preferably uses color in addition to the numerical display of time to inform the user of the length of time before the next update of market price. For example, the timer may be displayed as green until three seconds remain before a potential price update, and then be changed to red to indicate the possibility of an imminent OAP price change. A red timer warns traders that displayed option adjusted prices may change imminently, and that aggressive orders, if entered during this period, may not execute before the price update and therefore may trade at a price different than that currently shown in the stack window.

When the data feed fails to update as per the timer, the timer stops at 1 second for a time period determined by the intermediary. During this predetermined period, the timer turns gray, thus alerting the trader that updates are not occurring, although many other methods of alerting traders are possible.

Figures 4, 5:
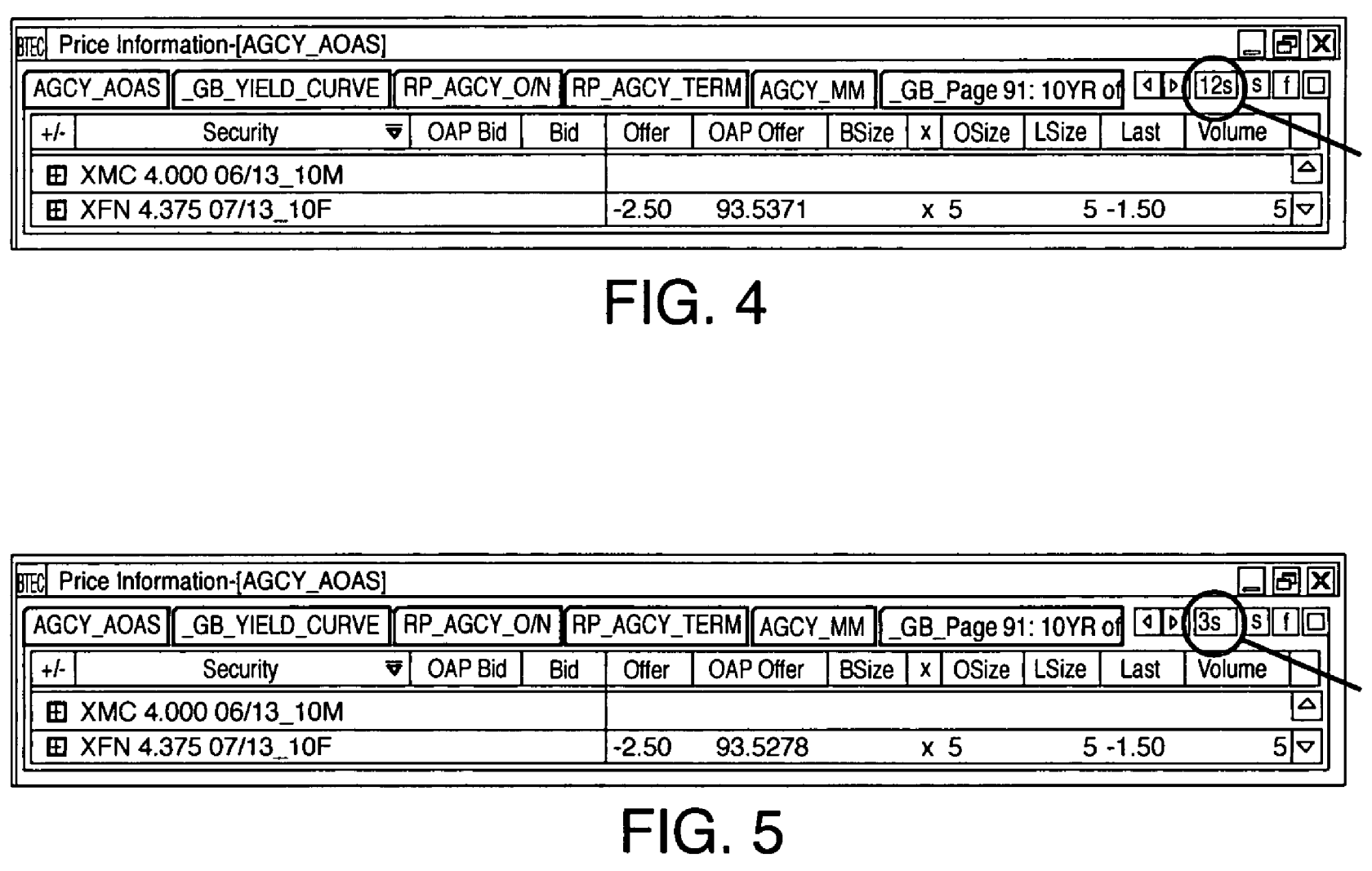

One preferred manner of displaying the timer is shown near the upper-right-hand corner of FIGS. 3-5. In FIG. 3, the timer is at 15 seconds ("15 s"). FIG. 4 illustrates the timer at 12 seconds, and FIG. 5 at 3 seconds. In FIG. 5, the background of the timer display is preferably red. The timer may be displayed in any desired form such as an hour glass, sliding bar, clock and may use any desired display technique such as fading colors to display the passage of time.

As noted, the Bond Market Association (BMA) has proposed a convention for calculating option adjusted prices derived form the model developed by Fischer Black. In a preferred embodiment, a model may be used to determine OAP prices that differs from that proposed by the BMA in the following respects:

Yield Curve: Points on the raw mid-yield curve are found using Act/365 number of years to maturity. Then these yields are interpolated using a tension spline to the Constant Maturity Debt Index (CMDI) points using the Fannie Mae (FNMA) recommendation endorsed by the BMA. However, the CMDI calculation is dynamic—as opposed to BMA recommendation to use yesterday's closing offsets- and "offsets" are recalculated every 15 seconds. Number of years-to-maturity are always found from the regular settlement date for that trading day—(even if the callable bond is traded When Issued or has a different settlement date). The system may be adapted to handle any specified yield curve using any day count convention, e.g., actual/365, actual/actual, 30/360, actual/360, etc.

Swaption Volatility: Years to expiry is found from regular settlement date for the given trading day to the Call Date of the bond, using Actual/365 number of years. Years for Swap Tenor (the difference in time between the maturity date and the call date) is computed as the number of Act/Act years from the Call Date to Maturity Date. Interpolation to find Base Volatility is done using the BMA recommended interpolation procedure, followed by the skew adjustment recommended by BMA.

Cash Flows Periods: For OAP to Price calculation, Cash Flow Periods follow a 30/365 day count and use the Callable Bond's actual settlement date as the starting point.

Call Date: When using the BMA model, the Call Date must coincide with a regular coupon payment date, otherwise OAS to Price calculation will fail. However, when using other OAS models, off cycles can be calculated accurately.

Short/Long First Coupon: These are allowed as long as the First Coupon Date is not the Call Date.

Short/Long Last Coupon: When using the BMA model, these are not allowed and will produce invalid results from the model. There are OAS models that can handle these kinds of situations, and the system of the present invention can support such OAS models. The timer feature can be used in these situations.

DV01: DV01 (Dollar Value 01) is computed by doing OAP to Price calculation by shifting the yield curve by one basis point up and one basis point down and then finding the average of the two DV01 estimates.

Hedge Price: The Hedge Price can be an exact price/yield produced from the model input or the trading markets, and can be rounded to the nearest decimal or fraction. For Agencies, this is the price corresponding to the raw mid-yield on the Yield curve used to compute OAP-to-Price. Settlement date used is the regular settlement date of the hedge instrument. For Treasuries, this is the midprice in the BrokerTec Indicative Pricing Engine which is based on the intermediary's treasury markets.

Compounding: The first coupon period is compounded the same way as the rest of the coupon periods. This differs from the BMA recommendation.

Figure 6:
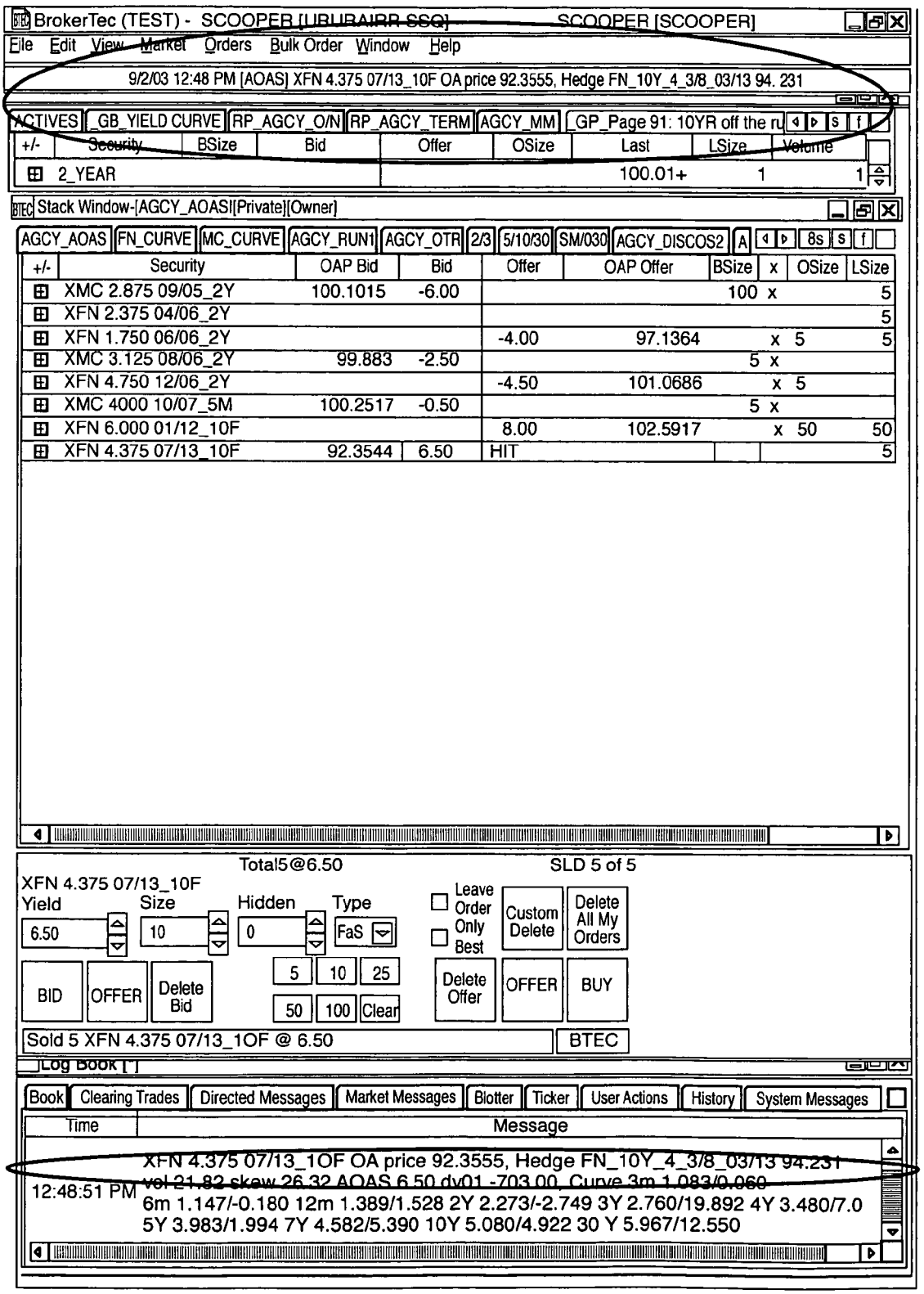
FIG. 6 shows the graphical user interface for display to a trader illustrating the directed message display screen.

Returning to FIG. 3, as noted, the graphical user interface further preferably comprises a log book window. In a preferred embodiment, this window comprises a tab for displaying directed messages. These may comprise specific messages generated from trading activity conducted via the intermediary and broadcast to selected traders or groups of traders using an internal API. For example, directed messages may be used to broadcast to a selected group of traders the terms of a transaction as it occurs in real time or to transmit trade confirmations to traders for complex products. Examples of directed messages concerning transaction terms are shown in the messages window in FIG. 3. Each directed message preferably includes all information used to calculate the OAP bid or offer price. Directed messages displaying transaction information may also, at the user's election, be displayed in a scrolling format across the top of the screen, as depicted in FIG. 6.

Directed messages may also be used to communicate alarm or warning information in text format and to supplement other alarm and warning methods. For example, filters may be used to detect changes to one trading page (e.g., an off-the-run swap page) while a trader is viewing another page (e.g., an actives page). A tab for the off-the-run swap page may be caused to turn to red to indicate that some change has occurred, but the trader would typically have no way of knowing what the change was without clicking on the tab and returning to the page where the change occurred. Using directed messages, however, a text message indicating the nature of the change may be displayed to the trader (e.g., locked market, order against, order better than, etc.).

While the invention has been described in conjunction with specific embodiments, it is evident that numerous alternatives, modifications, and variations will be apparent to those skilled in the art of the foregoing description.

The invention claimed is:

1. A system comprising:
a station coupled in communication with a central computer, the station being configured to receive, from the central computer, information regarding a financial instrument available for trade, said information including a price for said financial instrument and a periodically updated option adjusted price for said financial instrument, the option adjusted price being periodically updated by said central computer based on said financial instrument's type, and based on an option adjusted spread for said financial instrument, a skew adjusted volatility for said financial instrument, and a designated yield curve for said financial instrument, said designated yield curve being dynamically recalculated based on periodic updates to a constant maturity debt index for said financial instrument, the station being configured to output to a first display area a list of the financial instrument and the information regarding the financial instrument, and being configured to output to a second display area a timer for indicating as a graphical representation a time remaining before said option adjusted price may be adjusted.

2. The system of claim 1, wherein said graphical representation is numerical.

3. The system of claim 1, wherein said graphical representation is colour coded with changes in colour indicating changes in said time remaining.

4. The system of claim 1, wherein said graphical representation indicates said option adjusted price cannot be updated or cannot be displayed.

5. The system of claim 1, further comprising a third display area for indicating a directed message to at least one of said traders.

6. The system of claim 5, wherein said directed message includes terms of a transaction involving said financial instrument.

7. The system of claim 5, wherein said directed message includes a confirmation of a trade involving said financial instrument.

8. The system of claim 5, wherein said directed message includes attributes used to calculate said option adjusted price.

9. The system of claim 5, wherein said directed message includes a notice to said trader of activity within said system not otherwise displayed to said trader at said time of said activity.

10. The system of claim 9, wherein said directed message includes detailed information associated with said activity.

11. A system comprising:
a station coupled in communication with a central computer,
wherein the station is configured to receive, from the central computer, information regarding a financial instrument available for trade, said information including a price for said financial instrument, and a periodically updated option adjusted price for said financial instrument, and the station being configured to output to a first display area a list of the financial instrument and the information regarding the financial instrument,
wherein said station is configured to receive updated option adjusted prices from an intermediary that, at periodic intervals, determines whether an input utilised to calculate the displayed option adjusted price has changed, and if so, updates the displayed option adjusted price, to provide said periodically updated option adjusted price, the periodically updated option adjusted price being based on said financial instrument's type, and based on an option adjusted spread for said financial instrument, a skew adjusted volatility for said financial instrument, and a designated yield curve for said financial instrument, said designated yield curve being dynamically recalculated based on periodic updates to a constant maturity debt index for said financial instrument, whereby changes in inputs utilised to calculate the displayed option adjusted price do not trigger changes in the displayed option adjusted price on a continuous basis; and
wherein the station is configured to output a second display area that indicates a status associated with said option adjusted price, said status being a timer for indicating graphically a time remaining before said option adjusted price may be adjusted.

12. A method for an electronic trading station, the method comprising the acts of:
receiving, from a central computer, a first option adjusted price for a first financial instrument available for trade;
outputting, to a first display area, a list including information regarding the first financial instrument, said information including the first option adjusted price for said financial instrument;
periodically receiving, from the central computer, an updated option adjusted price for said first financial instrument, the updated option adjusted price being based on said first financial instrument's type, and based on an option adjusted spread for said first financial instrument, a skew adjusted volatility for said first financial instrument, and a designated yield curve for said first financial instrument, said designated yield curve being dynamically recalculated based on periodic updates to a constant maturity debt index for said first financial instrument;
periodically outputting, to the first display area, said updated option adjusted price for said first financial instrument; and
outputting, to a second display area, a status associated with said first option adjusted price, said status being a timer for indicating as a graphical representation, a time remaining before said option adjusted price may be adjusted.

13. The method of claim 12, wherein the list includes option adjusted prices for a plurality of financial instruments available for trade.

14. The method of claim 12, further comprising the act of:
outputting to a third display area an indication of a directed message to the electronic trading station.

* * * * *